(12) United States Patent
Wu et al.

(10) Patent No.: US 7,239,041 B2
(45) Date of Patent: Jul. 3, 2007

(54) LIGHT EMITTING DEVICE FOR VEHICLES

(75) Inventors: Hsiang-Chen Wu, Tao-Yuan (TW);
Ming-Shan Kuo, Kaohsiung Hsien (TW)

(73) Assignee: T.Y.C. Brother Industrial Co., Ltd., Tainan (TW)

( * ) Notice: Subject to any disclaimer, the term of this patent is extended or adjusted under 35 U.S.C. 154(b) by 111 days.

(21) Appl. No.: 10/981,520

(22) Filed: Nov. 5, 2004

(65) Prior Publication Data

US 2006/0097659 A1     May 11, 2006

(51) Int. Cl.
*B60L 1/14* (2006.01)
*B60Q 1/26* (2006.01)
*H05B 37/00* (2006.01)

(52) U.S. Cl. .................. 307/10.8; 315/80; 315/175

(58) Field of Classification Search ................. 315/80, 315/81, 82, 77, 175, 160; 307/10.1, 10.8, 307/128
See application file for complete search history.

(56) References Cited

U.S. PATENT DOCUMENTS 4,925,156 A * 5/1990 Stoll et al. ............. 251/129.01
5,309,142 A * 5/1994 Fritz ..................... 340/471
6,340,881 B1 * 1/2002 Meyer ................... 323/282

* cited by examiner

*Primary Examiner*—Brian Sircus
*Assistant Examiner*—Michael Rutland-Wallis
(74) *Attorney, Agent, or Firm*—Pillsbury Winthrop Shaw Pittman, LLP

(57) ABSTRACT

A light emitting device includes an input node set, a light emitting unit including at least one light emitting element connected across first and second nodes of the input node set, an impedance matching element having a first end connected to the first node, a switch unit connected between a second end of the impedance matching element and the second node, and a control unit connected in parallel to the light emitting unit and connected to the switch unit. The control unit is operable so as to control the switch unit to operate in an ON-state, where the switch unit makes connection between the impedance matching element and the second node when the first node is applied with an AC input power signal, or an OFF-state, where the switch unit interrupts connection between the impedance matching element and the second node when the first node is applied with a DC input power signal for a predetermined period.

8 Claims, 3 Drawing Sheets

LIGHT EMITTING DEVICE FOR VEHICLES

BACKGROUND OF THE INVENTION

1. Field of the Invention

The invention relates to a light emitting device, more particularly to a light emitting device for vehicles.

2. Description of the Related Art

Motor vehicles or motorcycles are generally installed with a lamp set, which is controlled by a power relay, at each of right and left sides on the rear of a vehicle body for providing indication when changing directions. Furthermore, for driving safety, another lamp set is installed at the rear of the vehicle body to provide indication when brakes are applied.

In a conventional motor vehicle provided with a single lamp unit, which includes a set of light emitting elements connected in parallel, for selectively providing indication when changing directions or when brakes are applied, a DC power, such as 12.8V, is supplied to the lamp unit for braking indication, whereas an AC power is supplied to the lamp unit via a power relay for direction indication. It is noted that the power relay must correspond to an equivalent impedance of the lamp unit in order to ensure normal flashing of the lamp unit at a predetermined frequency of 1-2 Hz. If one light emitting element of the lamp unit is broken, the equivalent impedance is increased so that the power relay enables the lamp unit to flash at a frequency higher than the predetermined frequency, such as 3-5 Hz, thereby altering the vehicle driver to repair the lamp unit. With such a construction, when the design conditions of the lamp unit, such as the number of the light emitting elements and the arrangement of the light emitting elements, are changed, it is necessary to provide an impedance matching element so as to maintain the equivalent impedance. It is noted that, due to the presence of the impedance matching element, heat generated thereby during a braking operation can result in damage to other elements. For example, the impedance matching element is usually mounted in the vicinity of a light casing made of an ABS material such that the light casing might melt when heat generated by the impedance matching element reaches about 90° C.

SUMMARY OF THE INVENTION

Therefore, the object of the present invention is to provide a light emitting device that can eliminate the aforesaid drawbacks of the prior art.

According to the present invention, there is provided a light emitting device adapted to be applied with one of an AC input power signal and a DC input power signal. The light emitting device comprises:

an input node set adapted for receiving said one of the AC and DC input power signals and including first and second nodes;

a light emitting unit including at least one light emitting element connected across the first and second nodes;

an impedance matching element having a first end connected electrically to the first node, and a second end;

a switch unit connected between the second end of the impedance matching element and the second node; and a control unit connected in parallel to the light emitting unit and connected to the switch unit, the control unit being operable so as to control the switch unit to operate in one of an ON-state, where the switch unit makes connection between the impedance matching element and the second node when the first node is applied with the AC input power signal, and an OFF-state, where the switch unit interrupts connection between the impedance matching element and the second node when the first node is applied with the DC input power signal for a predetermined period.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
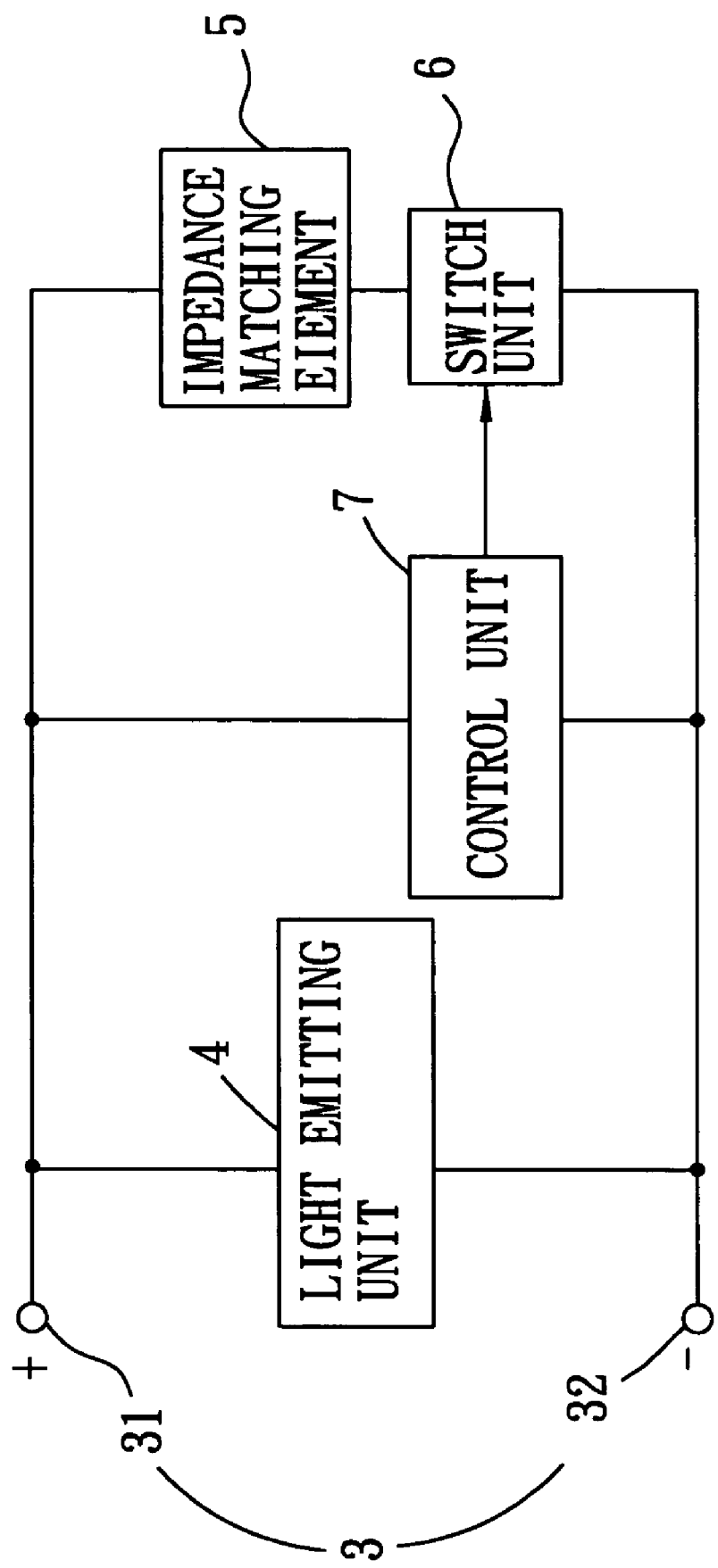
FIG. 1 is a schematic circuit block diagram illustrating the first preferred embodiment of a light emitting device according to the present invention.

Before the present invention is described in greater detail, it should be noted that like elements are denoted by the same reference numerals throughout the disclosure.

Figure 2:
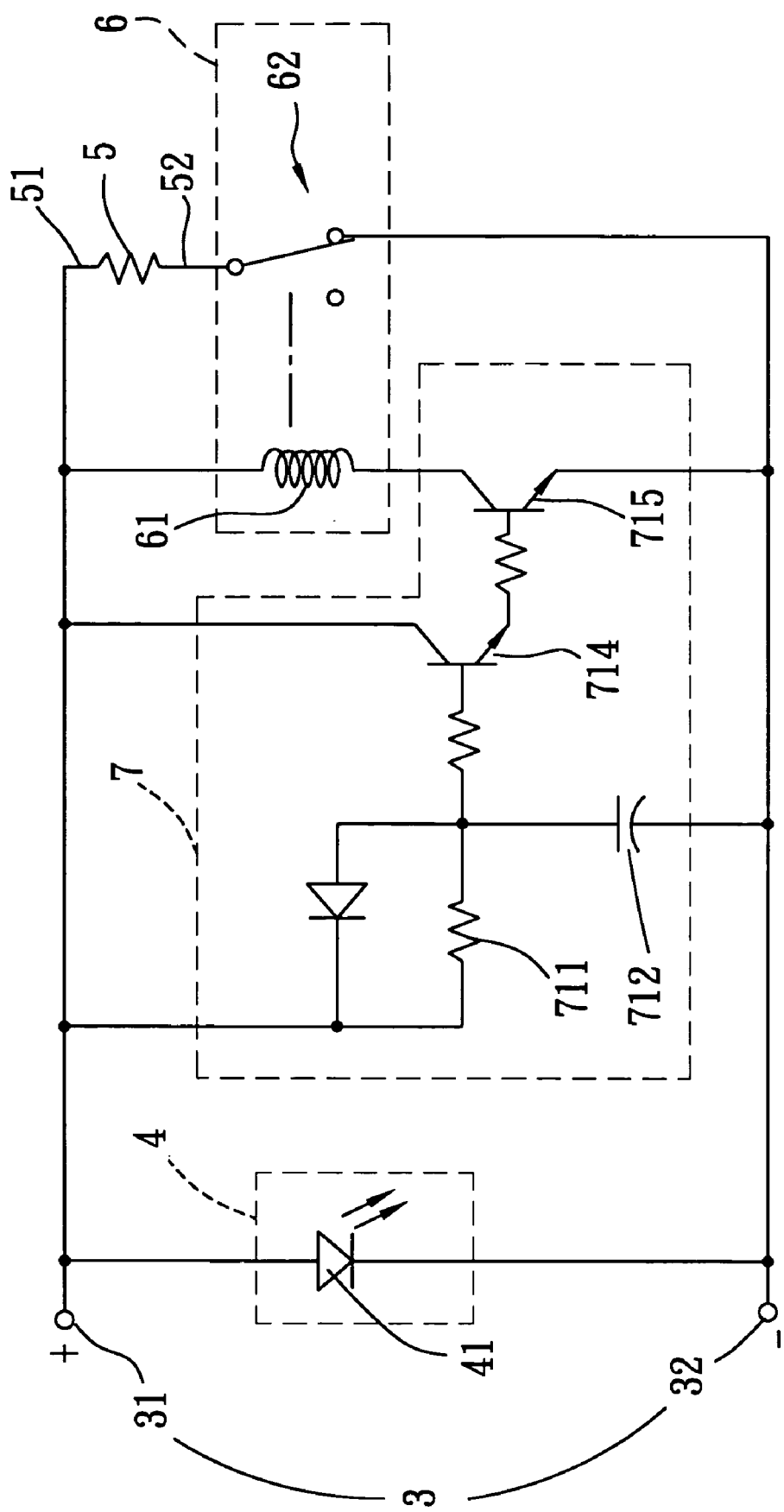
FIG. 2 is a schematic electrical circuit diagram illustrating the first preferred embodiment.

Referring to FIGS. 1 and 2, the preferred embodiment of a light emitting device according to the present invention is shown to include an input node set 3, a light emitting unit 4, an impedance matching element 5, a switch unit 6, and a control unit 7. In this embodiment, the light emitting device is adapted for use with a vehicle (not shown) as an indicator when changing directions or when brakes are applied. The light emitting device is adapted to be applied with an AC input power signal for signaling when changing directions (regardless of the application of brakes), and a DC input power signal for signaling when brakes are applied.

The input node set 3 is adapted for receiving the applied one of the AC and DC input power signals, and includes first and second nodes 31, 32.

The light emitting unit 4 includes at least one light emitting element, which can be one of a lamp and a light-emitting diode, connected across the first and second nodes 31, 32. In this embodiment, the light emitting unit 4 utilizes a single light-emitting diode 41 as the light emitting element.

The impedance matching element 5, which is a resistor in this embodiment, has a first end 51 connected electrically to the first node 31, and a second end 52.

The switch unit 6 is connected between the second end 52 of the impedance matching element 5 and the second node 32. In this embodiment, the switch unit 6 includes a mechanical relay that has a relay switch 62 coupled to the second end 52 of the impedance matching element 5 and the second node 32, and a relay coil 61 operably associated with the relay switch 62 and coupled to the control unit 7 and the first node 31.

The control unit 7 is connected in parallel to the light emitting unit 4 and is connected to the switch unit 6, as shown in FIG. 1. The control unit 7 is operable so as to control the switch unit 6 to operate in one of an ON-state, where the switch unit 6 makes connection between the impedance matching element 5 and the second node 32 when the first node 31 is applied with the AC input power signal, and an OFF-state, where the switch unit 6 interrupts connection between the impedance matching element 5 and the second node 32 when the first node 31 is applied with the DC input power signal for a predetermined period. In this embodiment, the control unit 7 permits current flow through the relay coil 61 when the first node 31 is applied with the DC input power signal for the predetermined period such that the relay switch 62 is energized so as to switch operation of the switch unit 6 from the ON-state to the OFF-state. On the other hand, the control unit 7 inhibits current flow through the relay coil 61 when the first node 31 is applied with the AC input power signal such that the relay switch 62 is de-energized so as to maintain operation of the switch unit 6 at the ON-state.

In this embodiment, the control unit 7 includes an RC circuit consisting of a resistors 711 and a capacitor 712, and NPN transistors 714, 715. The resistance of the resistor 711 and the capacitance of the capacitor 712 are determined so that the time required for fully-charging the capacitor 712 is greater than a half-cycle of the AC input power signal and smaller than the predetermined period. In actual operation of the control unit 7, when the AC input power signal is applied to the first node 31, the capacitor 712 is not fully charged, and the NPN transistors 714, 715 are turned off, thereby maintaining operation of the switch unit 6 at the ON-state. On the other hand, when the DC input power signal is applied to the first node 31 for the predetermined period, the capacitor 712 is fully charged to a potential sufficient to turn on the NPN transistors 714, 715, thereby switching operation of the switch unit 6 from the ON-state to the OFF-state. As a result, when the duration of braking operation of the vehicle exceeds the predetermined period, the switch unit 6 is switched to the OFF-state, thereby reducing the heat generated by the impedance matching element 5.

Figure 3:
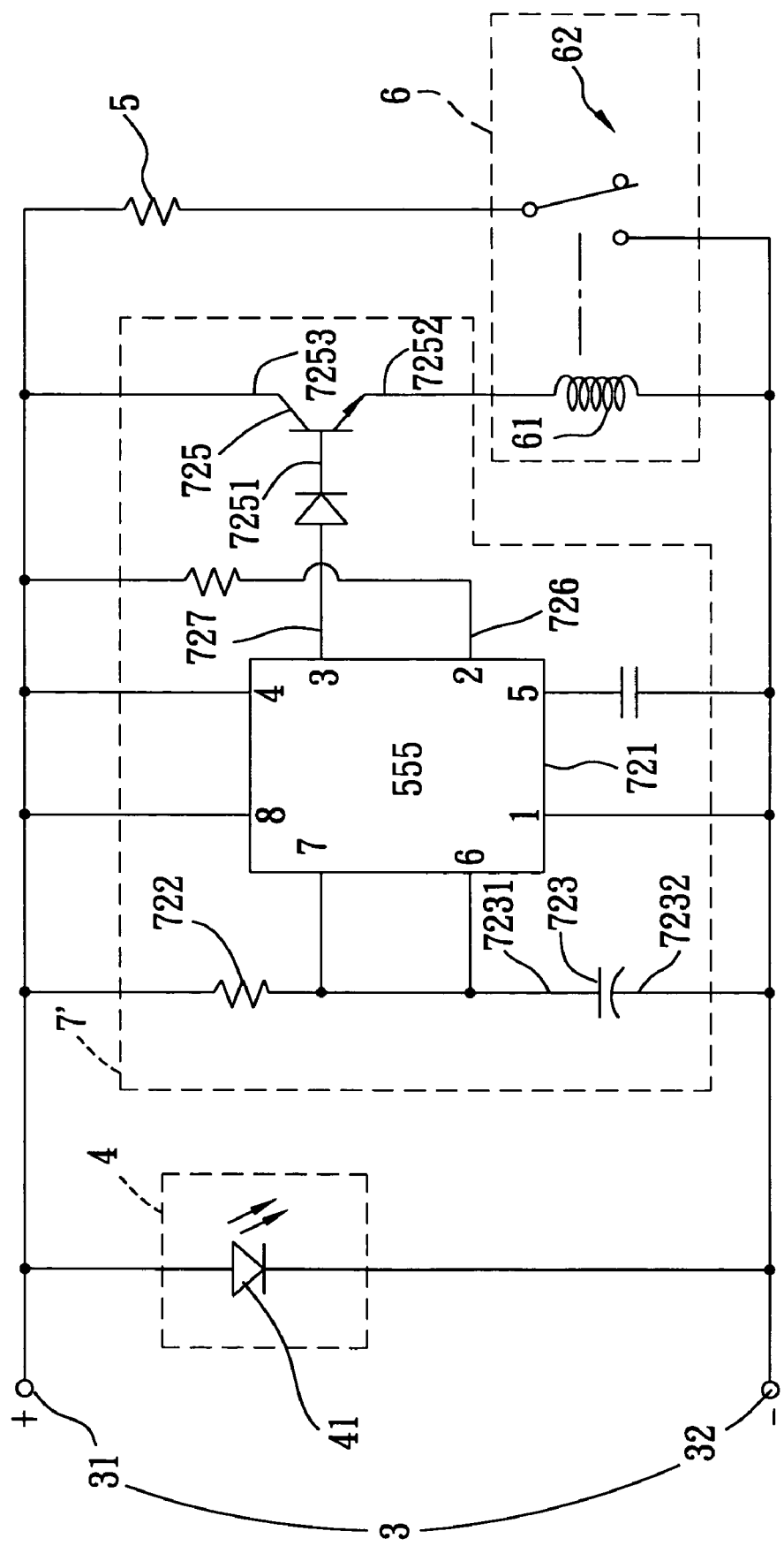
FIG. 3 is a schematic electrical circuit diagram illustrating the second preferred embodiment of a light emitting device according to the present invention.

FIG. 3 illustrates the second preferred embodiment of a light emitting device according to this invention, which is a modification of the first preferred embodiment. Unlike the previous embodiment, the relay coil 61 of the switch unit 6 is coupled to the control unit 7 and the second node 32.

In this embodiment, the control unit 7' inhibits current flow through the relay coil 61 when the first node 31 is applied with the DC input power signal for the predetermined period such that the relay switch 62 is de-energized so as to maintain operation of the switch unit 6 at the OFF-state. On the other hand, the control unit 7' permits current flow through the relay coil 61 when the first node 31 is applied with the AC input power signal such that the relay switch 62 is energized so as to switch operation of the switch unit 6 from the OFF-state to the ON-state.

The control unit 7' includes a timer integrated circuit 721, such as a 555 IC, which includes a logic-low trigger end 726 coupled to the first node 31, and an output end 727; a resistor 722 connected across the first node 31 and the timer integrated circuit 721; a capacitor 723 having one end 7231 coupled to the timer integrated circuit 721 and the resistor 722, and another end 7232 coupled to the second node 32; and an NPN transistor 725 having a base 7251 coupled to the output end 727, an emitter 7252 coupled to the relay coil 61, and a collector 7253 coupled to the first node 31. In such a construction, the timer integrated circuit 721 outputs a logic-low signal at the output end 727 when a logic-high signal at the trigger end 726 persists for the predetermined period.

In actual operation of the control unit 7', when the AC input power signal is applied to the first node 31, since the predetermined period is greater than a half-cycle of the AC input power signal, the timer integrated circuit 721 is intermittently triggered such that the timer integrated circuit 721 maintains a logic-high signal at the output end 727, thereby turning on the NPN transistor 725 so as to ensure operation of the switch unit 6 to the ON-state. On the other hand, when the DC input power signal is applied to the first node 31 for the predetermined period, the timer integrated circuit 721 outputs the logic-low signal at the output end 727 such that the NPN transistor 725 is turned off, thereby maintaining operation of the switch unit 6 at the OFF-state.

To sum up, the light emitting device of this invention can replace conventional lamps used in a vehicle as an indicator when changing directions or when brakes are applied. Furthermore, the control unit 7, 7' of the light emitting device can automatically interrupt current flow through the impedance matching element 5 in the event of prolonged application of brakes, thereby reducing the heat generated by the impedance matching element 5.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A light emitting device adapted to be applied with one of an AC input power signal and a DC input power signal, said light emitting device comprising:
    an input node set adapted for receiving said one of the AC and DC input power signals and including first and second nodes;
    a light emitting unit including at least one light emitting element connected across said first and second nodes;
    an impedance matching element having a first end connected electrically to said first node, and a second end;
    a switch unit connected between said second end of said impedance matching element and said second node; and
    a control unit connected in parallel to said light emitting unit and connected to said switch unit, said control unit being operable so as to control said switch unit to operate in one of an ON-state, where said switch unit makes connection between said impedance matching element and said second node when said first node is applied with the AC input power signal, and an OFF-state, where said switch unit interrupts connection between said impedance matching element and said second node when said first node is applied with the DC input power signal for a predetermined period.

2. The light emitting device as claimed in claim 1, wherein said switch unit includes a mechanical relay that has a relay switch coupled to said second end of said impedance matching element and said second node, and a relay coil operably associated with said relay switch and coupled to said control unit and one of said first and second nodes.

3. The light emitting device as claimed in claim 2, wherein:
    said control unit permits current flow through said relay coil when said first node is applied with the DC input power signal for the predetermined period such that said relay switch is energized so as to switch operation of said switch unit from the ON-state to the OFF-state;
    said control unit inhibiting current flow through said relay coil when said first node is applied with the AC input power signal such that said relay switch is de-energized so as to maintain operation of said switch unit at the ON-state.

4. The light emitting device as claimed in claim 1, wherein said light emitting element of said light emitting unit is one of a lamp and a light-emitting diode.

5. The light emitting device as claimed in claim 1, wherein said impedance matching element includes a resistor.

6. The light emitting device as claimed in claim 1, wherein said control unit includes a timer integrated circuit.

7. The light emitting device as claimed in claim 2, wherein said control unit includes a timer integrated circuit.

8. The light emitting device as claimed in claim 7, wherein:

said control unit inhibits current flow through said relay coil when said first node is applied with the DC input power signal for the predetermined period such that said relay switch is de-energized so as to maintain operation of said switch unit at the OFF-state;

said control unit permitting current flow through said relay coil when said first node is applied with the AC input power signal such that said relay switch is energized so as to switch operation of said switch unit from the OFF-state to the ON-state.

* * * * *